Patented Apr. 3, 1951

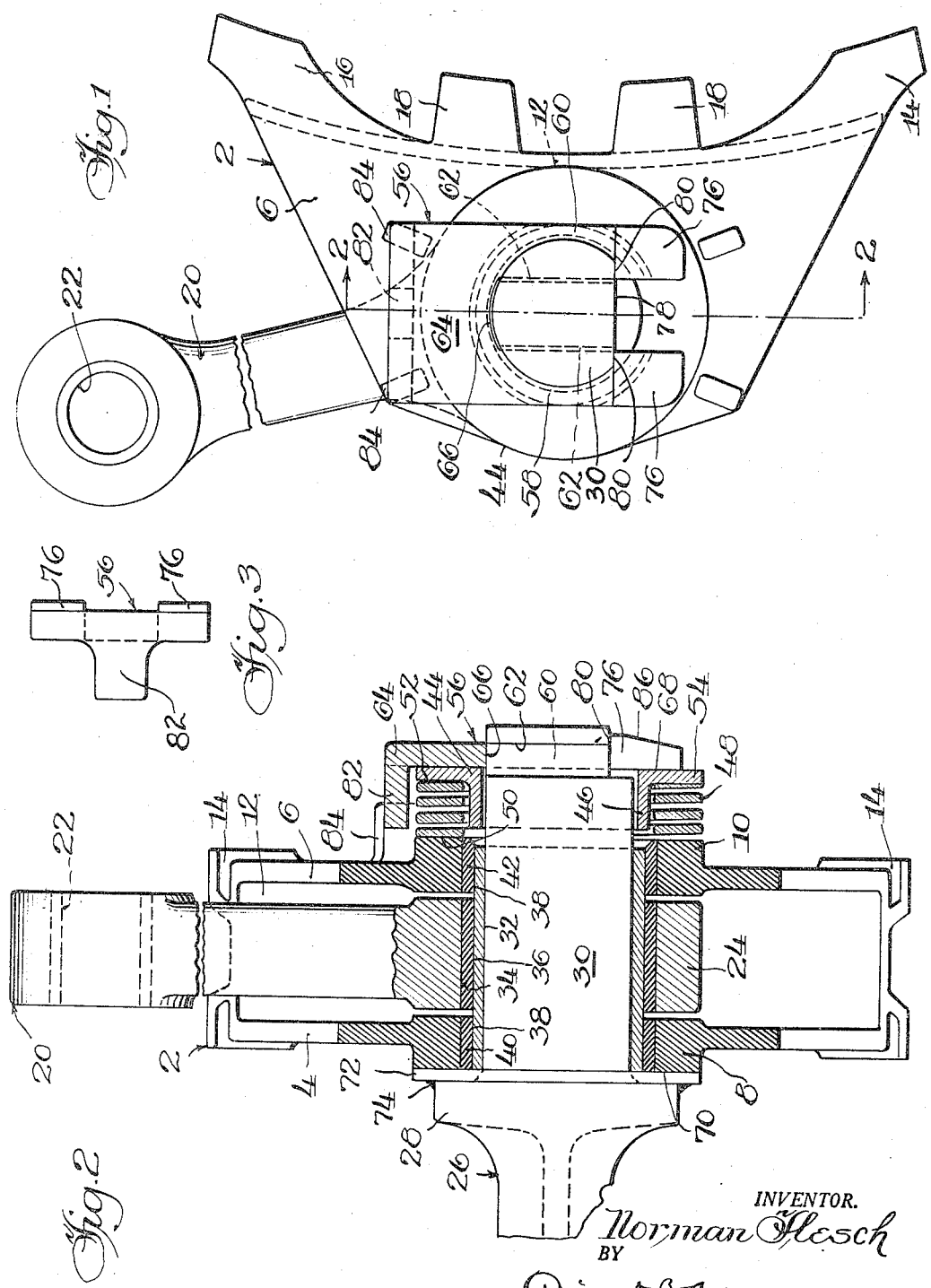

2,547,572

UNITED STATES PATENT OFFICE 2,547,572

BRAKE HEAD ARRANGEMENT

Norman Flesch, Chicago, Ill., assignor to American Steel Foundries, Chicago, Ill., a corporation of New Jersey Application September 27, 1945, Serial No. 618,868

4 Claims. (Cl. 287—93)

My invention relates to railway brake equipment and more particularly to novel brake head mounting and balancing means.

An object of my invention is to provide novel means for mounting a brake head on an associated supporting brake member in such manner as to adjustably maintain the brake head in a desired operative position with respect to the braking surface of a wheel or other member to be braked.

A specific object of my invention is to provide a brake head mounting and balancing arrangement comprising novel locking means for securing a brake head on a brake beam including means for frictionally resisting movement of the brake head and limiting rotation of the same whereby the head is adjustably held in its operative position with respect to the wheel.

Another object of my invention is to provide novel locking means for securing the brake head to its supporting member comprising a single locking element interlocked with the member for maintaining the brake head in assembly with the member, said element serving to compress resilient means operative to effect frictional resistance to rotative movement of the head and also cooperating with the head to limit such movement.

My invention comprehends the provision of adjustable and retaining means for mounting and adjustably maintaining a brake head on its supporting member, simple in arrangement, comprising a minimum number of parts readily manufactured and easily assembled, and of rugged construction.

Still another object of my invention is to design an arrangement such as described in which a spring, surrounding the brake beam, is compressed between the brake head member and an adjacent spring plate member positioning the spring whereby said members are urged apart axially of the beam into engagement with friction means thereon, a single locking element being provided to compress the spring for the purpose described and cooperating with the brake beam to maintain the parts in assembly.

Other various and novel features of the invention will be apparent from the following description and drawings and will be particularly pointed out in the appended claims.

In the drawings:

Figure 1 is a side elevation of a brake head provided with a locking device made in accordance with my invention;

Figure 2 is an end view, partly in section, said section being taken in the vertical plane indicated by the line 2—2 of Figure 1;

Figure 3 is a top view of the locking member utilized in the locking device illustrated in Figures 1 and 2.

Describing my invention in detail, the brake head generally designated 2 comprises the spaced inboard and outboard side walls 4 and 6 providing parallel bearing portions 8 and 10 respectively, said side walls having a transverse wall 12 extending therebetween and merging therewith and also merging with the spaced end lugs 14 and 16 and the intermediate lugs 18, 18, said lugs being formed and arranged for connection to an associated brake shoe in conventional manner.

The brake hanger generally designated 20 is formed at its upper end with a bushed opening 22 affording a pivotal connection to a supporting frame member (not shown). The opposite end of the hanger 20 is provided with a bearing portion 24 extending between the spaced side walls 4 and 6 of the brake head.

The brake beam generally designated 26 is shown with the end thereof formed with a shoulder or collar 28 beyond which is a journal portion or trunnion 30 to which may be tightly fitted as by a press fit a bushing 32. The trunnion 30 extends through aligned openings in the brake head bearing portions 8 and 10 and the hanger bearing portion 24 with the bushing 32 on said trunnion in bearing engagement with the bushing 34 of the hanger bearing portion 24 as at 36 and as at 38 with the bushings 40 and 42 fitted respectively in the bearing portions 8 and 10 of the brake head.

Sleeved over the outboard end of the trunnion 30 and slidably fitted thereon is a spring plate 44 spaced from the bushing 32 on said trunnion and having a cylindrical portion 46 over which may be sleeved a coil spring 48 having its one end in abutment as at 50 with the brake head bearing portion 10 and having its other end bearing as at 52 against the flange 54 at one end of the portion 46 of the spring plate 44, said spring thus being centered and held in position by the spring plate 44.

The brake assembly described is maintained in assembled relationship by means of a washer-like retaining or locking member generally designated 56 and shown in detail in Figure 3, said member being of rectangular form having an elongate slot therein providing a lower bifurcated portion comprising spaced legs 58 and 60 fitting within substantially parallel slots 62, 62 in opposite sides of the trunnion end and in interlocking engagement therewith, the upper portion 64 of the member 56 connecting the legs 58 and 60 thereof at one end of the slot therein and being formed with an arcuate surface in complementary engagement as at 66 with the perimeter of the trunnion 30. In the assembly described, the retaning member 56 serves to compress the spring 48 between the brake head and the plate 44, whereby the plate 44 will be urged into frictional engagement as at 68 with the member 56, and the bearing portion 8 of the head 2 will be urged into frictional engagement as at 70 with an annular friction plate 72 surrounding the inboard end of the trunnion 20 and welded as at 74 to the shoulder 28 of the beam 26, the frictional resistance afforded by the engagement of the plate 44 and member 56 and the engagement of the brake head bearing portion 8 and friction plate 72 adjustably maintaining the brake head in a desired operative position to the braking surface of a wheel or other member to be braked. It will be understood by those skilled in the art that, if desired, the friction plate 72 may be eliminated and the brake head may bear directly against the shoulder 28 of the beam, so that the plate 72 may, for functional purposes, be regarded as a part of the beam itself.

To prevent accidental or unwanted movement of the retaining member 56 in an upward direction and disengagement of the same from the trunnion end, the legs 58 and 60 of the member 56 are provided at their lower extremities with lugs 76, 76 projecting outwardly therefrom toward the outboard end of the trunnion and underlying a plane surface 78 afforded by the machined lower portion of the trunnion 30 and having engagement therewith as at 80, 80. It will be apparent that the pressure of the spring urging the plate 44 into engagement with the member 56 will maintain the lugs 76, 76 of the member 56 in position beneath the trunnion 30 and thereby positively prevent unwanted upward movement of the member 56 and accidental disassembly of the brake head, the brake hanger and the brake beam.

To limit rotation of the brake head on the trunnion of the beam 26, the retaining member 56 is formed at its upper end with the inwardly projecting lug 82 positioned between the diagonally arranged lugs 84, 84 on the brake head 2 which converge toward the axis of the trunnion 30 and are engageable with the lug 82 in either direction of rotation of the brake head on the beam 26, whereby the rotation of the head will be maintained within limits permitting the brake head to adjust itself to the braking surface of the wheel. It may also be noted that in the event that the spring 48 should become broken, as sometimes occurs under the severe conditions to which a device of this type is subjected, the pivotal movement of the head will be limited by the abutment of either of the lugs 84, 84 of the brake head with the lug 82 of the retaining member 56, thus preventing extreme rotation of the head to a point at which it might be knocked off the beam, thereby creating the danger of derailment.

In the assembly of the brake arrangement described, the brake head and hanger are placed in assembled relationship with the openings in the bearing portions thereof in alignment and the trunnion 30 of the brake beam 26 inserted therein. The spring 48 may then be sleeved over the spring plate 44 and the assembly positioned on the trunnion 30. Thereafter the bottom of the legs 58 and 60 of the retaining member 56 may be positioned in alignment with the respective slots in the trunnion 30. It may be noted that the cross sectional area of each of the slots in the trunnion is substantially greater than that of the leg 58 or 60 of the retaining member 56, whereby upon insertion of the bottom of the legs 58 and 60 in the respective slots in the trunnion and subsequent urging of the retaining member 56 in a downward direction to place the spring under compression by the member 56 exerting pressure on the spring plate 44, the legs will pass through the slots until the lugs 76, 76 are urged outwardly underneath the machined portion of the trunnion 30 by the spring 48. It will be apparent that a snap-lock condition will thus occur between the member 56 and the trunnion 30 positively locking the device in its assembled relationship. It may be noted from a consideration of Figure 2 that each of the lugs 76, 76 of the member 56 is provided with the wedge surface 86 sloping toward the lower extremity thereof to facilitate the entrance of the lugs into the slots in the trunnion.

It will be apparent from the foregoing that my novel brake head balancing device is of relatively simple design and provides a snap-lock connection for maintaining the brake head, brake hanger, and brake beam in assembly, said device being operative to provide frictional resistance to the rotation of the brake head whereby the brake head may adjustably maintain itself on the brake beam in operative relationship to the braking surface of the wheel while providing means limiting rotation of the brake head between positions insuring the proper relationship of the brake head to the wheel.

As the device for accomplishing these purposes consists of only three pieces, it may be economically manufactured and easily assembled with the brake beam and brake head while providing a structure of rugged construction.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a retainer and balancing device for an assembly having a pivotal member, a cylindrical pivot member extending through a complementary opening in the pivotal member, and engageable friction surfaces on said members angularly related to the pivotal axis of said pivotal member; the combination of spaced slots in said pivot member extending transversely thereof, a retainer having a body portion and having spaced legs received within respective slots, an annular spring seat sleeved over the pivot member movable axially thereof and frictionally engageable with the inboard side of said body portion and legs, a coil spring compressed between the spring seat and pivotal member for urging said friction surfaces into engagement and for urging the spring seat into frictional engagement with the retainer body portion and legs, and means on said body portion and pivotal member for limiting pivotal movement of the latter.

2. In a retainer and balancing device for an assembly having a pivotal member, a cylindrical pivot member extending through a complementary opening in the pivotal member, and engageable friction surfaces on said members angularly related to the pivotal axis of said pivotal member; the combination of a bifurcated retainer member having a body and having spaced legs embracing the pivot member, stop means on the pivot member engaging the outboard surfaces of said legs, said retainer member being interlocked with the pivot member against relative rotative movement on said axis, an annular spring seat sleeved over the pivot member and movable axially thereof, a coil spring sleeved over the pivot member and compressed between the spring seat and the pivotal member for urging said friction surfaces into engagement and for urging the spring seat into frictional engagement with the retainer body and legs, an inboard projection on said spring seat sleeved within the spring to space the latter from the pivot member, stop means on said pivotal member, and abutment means on said body normally spaced from and engageable with said last-mentioned stop means for limiting pivotal movement of the pivotal member.

3. In a retainer and balancing device for an assembly having a pivotal member, a pivot member extending through a complementary opening in the pivotal member, and engageable friction surfaces on said members angularly related to the pivotal axis of said pivotal member; the combination of a retainer member having spaced legs embracing the pivot member and interlocked therewith against relative rotative movement on said axis and against axial outboard movement of the retainer member, an annular spring seat sleeved over the pivot member and movable relative thereto, said seat being frictionally engaged with said legs to accommodate rotational movement of the seat relative to the retainer member, a coil spring compressed between the seat and the pivotal member for urging the seat into frictional engagement with the legs and for urging the friction surfaces into engagement, spaced surfaces on one of said pivotal and retainer members and a lug on the other member received between said spaced surfaces and engageable therewith for limiting pivotal movement of the pivotal member.

4. In a retainer and balancing device for an assembly having a pivotal member, a cylindrical pivot member extending through a complementary opening in the pivotal member, and engageable friction surfaces on said members angularly related to the pivotal axis of said pivotal member; the combination of a cylindrical spring plate on said pivot member movable axially thereof, said plate having an annular flange at one end thereof, a coil spring sleeved over said plate and spaced thereby from said pivot member, said spring being compressed between said flange and said pivotal member for urging said friction surfaces into engagement, spaced slots in the sides of said pivot member extending transversely thereof outboard of said plate, a retainer having a body and having spaced legs embracing the pivot member and extending through respective slots, said legs having outboardly projecting lugs overlapping the pivot member to prevent accidental disassembly of said legs from said slots, the inboard side of said retainer having a continuous friction surface on said body and legs frictionally engaged with a continuous friction surface on said flange, and an inboardly projecting lug on the retainer body, and spaced surfaces on the pivotal member at opposite sides of said lug and engageable therewith to limit pivotal movement of the pivotal member.

NORMAN FLESCH.

REFERENCES CITED

The following references are of record in the file of this patent:

UNITED STATES PATENTS

| Number | Name | Date |
| --- | --- | --- |
| 527,296 | Shephard | Oct. 9, 1894 |
| 1,421,881 | Williams | July 4, 1922 |
| 1,831,701 | Brandt | Nov. 10, 1931 |
| 2,010,531 | Baselt | Aug. 6, 1935 |